US007388988B2

(12) United States Patent
Luo (10) Patent No.: US 7,388,988 B2
(45) Date of Patent: Jun. 17, 2008

(54) SYSTEMS AND METHODS FOR PROCESSING BOUNDARY INFORMATION OF A GRAPHICAL OBJECT

(75) Inventor: Huitao Luo, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 10/046,797

(22) Filed: Jan. 14, 2002

(65) Prior Publication Data

US 2003/0132947 A1 Jul. 17, 2003

(51) Int. Cl.
*G06K 9/48* (2006.01)
(52) U.S. Cl. ........................... 382/199; 382/242
(58) Field of Classification Search ................ 345/619; 382/199, 242
See application file for complete search history.

(56) References Cited

U.S. PATENT DOCUMENTS

| | | | | |
|---|---|---|---|---|
| 4,843,630 | A * | 6/1989 | Catros et al. | 382/130 |
| 5,471,535 | A * | 11/1995 | Ikezawa et al. | 382/199 |
| 5,774,595 | A * | 6/1998 | Kim | 382/241 |
| 5,974,175 | A * | 10/1999 | Suzuki | 382/199 |
| 6,055,337 | A * | 4/2000 | Kim | 382/242 |
| 6,332,034 | B1 * | 12/2001 | Makram-Ebeid et al. | 382/128 |

OTHER PUBLICATIONS

Huitao Luo and Alexandro Eleftheriadis, "Desiging an Interactive Tool for Video Object Segmentation and Annotation," Advent Group, Columbia University, Jul. 12, 1999.*

Huitao Luo and Alexandros Eleftheriadis, "Designing an Interactive Tool for Video Object Segementation and Annotation," Advent Group, Columbia University, Jul. 12, 1999.

Guido M. Schuster and Aggelos K. Katsaggelos, Fellow, IEEE, "An Optimal Polygonal Boundary Encoding Scheme in the Rate Distortion Sense," IEEE Transactions on Image Processing, vol. 7, No. 1, Jan. 1998.

Schuster G M et al: "Operationally optimal Vertex-Based Shape Coding" IEEE Signal Processing Magazine, IEEE Inc. NY, US vol. 15, No. 6, Nov. 1998 pp. 91-108 XP001066520.

Orange C M et al: "Magnetic Contour Tracing" Visualization and Machine Version, 1994, Proceedings., IEEE Workshop on Seattle, WA USA Jun. 24, 1994, Los Alamitos, CA, USA IEEE Comput. Soc 1994 pp. 33-44 XP 0100099598.

Luo H. et al: "An interactive Authoring System for video object segmentation and annotation" Signal Processing. Image Communication, Elsevier Science Publishers, Amsterdam NL, vol. 17 No. 7 Aug. 2002 pp. 559-572 XP004372662.

(Continued)

*Primary Examiner*—Kee Tung
*Assistant Examiner*—Aaron M Richer (57) ABSTRACT

In one embodiment, the present invention is directed to a method for processing boundary information of a graphical object. The method may comprise: receiving a graphical image that comprises the graphical object, wherein the graphical object is defined by at least the boundary information; determining a plurality of vertices from the boundary information; and creating an approximated boundary utilizing at least the plurality of vertices, the graphical image, and a predetermined function that is operable to detect a contour between a pair of vertices by analyzing the graphical image.

33 Claims, 6 Drawing Sheets

OTHER PUBLICATIONS

"AMOS: An Active System for MPEG-4 Video Object Segmentation;" Zhong et al.; IEEE International Conference on Image Processing; Oct. 1998; 5 pps.

"Interactive Segmentation with Intelligent Scissors;" Mortensen et al.; Graphical Models and Image Processing, vol. 60, Jun. 1998; pp. 349-384.

"Partition-Based Image Representation as Basis for User-Assisted Segmentation;" Marques et al.; IEEE International Conference on Image Processing; Oct. 2001; 4 pps.

"Dynamic Programming for Detecting, Tracking, and Matching Deformable Contours;" Geiger et al.; IEEE Transactions on Pattern Analysis and Machine Intelligence, vol. 7, No. 3; Mar. 1995; pp. 294-302.

"Using Dynamic Programming for Solving Variational Problems in Vision;" Amini et al.; IEEE Transactions on Pattern Analysis and Machine Intelligence, vol. 12, No. 9; Sep. 1990; pp. 855-867.

"Snakes Active Contour Models;" Kass et al.; International Journal of Computer Vision, vol. 1, No. 4, 1987; pp. 321-331.

"Introduction to Algorithms;" Cormen et al.; "Dijkstra's Algortihm;" Chapter 24.3 MIT Press; 2001; pp. 595-599.

* cited by examiner

Input: f (start point), e (ending point), Dist(p,q) (local distance definition)
Assistant Data Structure:
  L1 (active list 1)
  L2 (active list 2)
  C(p) (cumulative distance from f to p)
Output: ptr (minimal cost path pointers)
Algorithm:
(1001)  Initialize assistant data structure (L1, L2 are set empty, and C to $+\infty$).
(1002)  Set initial threshold $T_0$ and increasing step $\delta_T$.
(1003)  $T = T_0$;
(1004)  push(L1, f, 0 );
(1005)  while( $T <= T_{max}$ and C(e)==$+\infty$ ) {
(1006)      while( num(L1)>0 ) {
(1007)          pop( L1, p );
(1008)          flag_thresholded=0;
(1009)          for (each $q \in N(p)$) {
(1010)              if( Dist(p, q)>T ) {
(1011)                  flag_threshold=1; continue;
(1012)              }
(1013)              $d' = C(p) + \text{Dist}(p, q)$;
(1014)              if( $d'$ <C(q) ) {
(1015)                  if( q is in L1 ) remove( L1, q );
(1016)                  C(q)=$d'$;
(1017)                  ptr(q)=p;
(1018)                  push( L1, q, $d'$ );
(1019)              }
(1020)          } //end of for
(1021)          if( flag_threshold ) {
(1022)              push( L2, p, C(p) );
(1023)          }
(1024)      } //end of inner while
(1025)      T=T+$\delta_T$;
(1026)      Copy L1 from L2 and clean L2.
(1027) } //end of outer while

FIG. 12

SYSTEMS AND METHODS FOR PROCESSING BOUNDARY INFORMATION OF A GRAPHICAL OBJECT

FIELD OF THE INVENTION

The present invention is in general related to computer graphics and, more particularly, to systems and methods for processing boundary information of a graphical object.

BACKGROUND OF THE INVENTION

Shape coding is utilized by a number of multimedia applications to enable various image processing techniques. For example, shape coding is utilized by digital photograph editor applications. After a shape is coded or defined, the digital photograph editor applications permit a user to modify only the graphical information inside the encoded shape. For example, the graphical information inside the shape may be "cut-and-pasted" onto a new background.

Various data structures and algorithms have been employed to encode shapes. For example, region-based approaches have been developed. Region-based schemes encode an object by a support map which is a binary image with ones representing the object region and zeros representing the background region. In this manner, the shape coding is converted to a binary image coding problem. Exemplary region-based algorithms include the algorithms developed by Joint Binary Images Group (JBIG), JBIG2, and Moving Picture Experts Group-4 (MPEG-4).

Boundary-based algorithms are also frequently utilized. For example, a user may manually select each pixel of a boundary of an object in a graphical image. The coordinates of each selected pixel may be stored to define the boundary. Moreover, various schemes have been utilized to approximate the boundary defined by stored coordinates such as chain coding, polygon approximation, high-order curve fitting (splines) approximation, and combined polygon-spline approximation. The approximation algorithms reduce the amount of data required to represent the boundary to varying degrees.

However, known shape encoding algorithms are independent of the algorithm utilized to present the underlying graphical image (e.g., bit map, video image, and/or the like). Accordingly, known shape encoding algorithms require an appreciable amount of data in addition to the underlying graphical image.

BRIEF SUMMARY OF THE INVENTION

In one embodiment, the present invention is directed to a method for processing boundary information of a graphical object. The method may comprise: receiving a graphical image that comprises the graphical object, wherein the graphical object is defined by at least the boundary information; determining a plurality of vertices from the boundary information; and creating an approximated boundary utilizing at least the plurality of vertices, the graphical image, and a predetermined function that is operable to detect a contour between a pair of vertices by analyzing the graphical image.

DETAILED DESCRIPTION OF THE INVENTION

Embodiments of the present invention are related to encoding information that defines a boundary of an object in a graphical image. For these embodiments, it is assumed that the boundary is already defined. For example, a user may select points from the graphical image to define the boundary. The boundary may be represented, for example, by a set of pixels from the graphical image.

Figure 1:
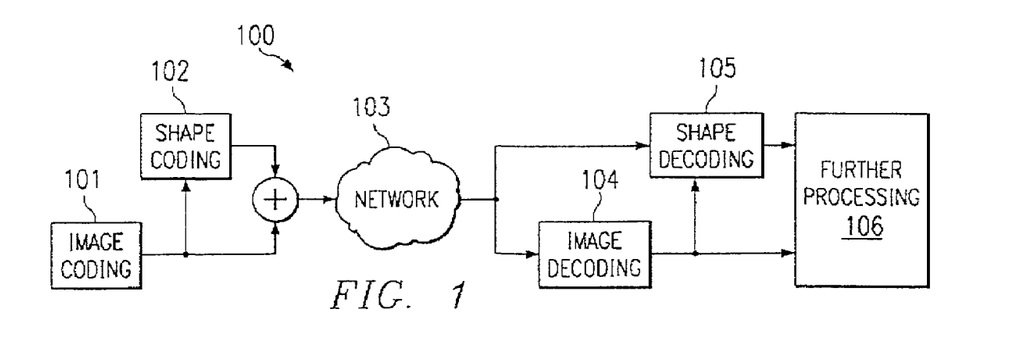
FIG. 1 depicts an exemplary system for encoding boundary information according to embodiments of the present invention.

FIG. 1 depicts exemplary system 100 according to embodiments of the present invention. System 100 performs image coding 101 and shape coding 102. Shape coding 102 performs shape dependent coding. Specifically, shape coding 102 defines the shape or boundary of an object by reference to the underlying image represented in the data associated with shape coding 102. The boundary of the object is highly correlated to underlying graphical image. Because of the high degree of correlation, shape coding 102 is capable of reducing the amount of data needed to represent the boundary. Shape coding 102 reduces the amount of data needed to represent the boundary by not directly coding the coordinates of its node point elements. Rather, shape coding 102 codes the boundary by a mechanism or function that detects the point elements from the original image.

It shall be appreciated that removing the correlation between a boundary (or a shape) and the underlying graphical image has been a significant challenge prior to the present invention. Particularly, correlation between textured images and their boundaries are very difficult to represent in a closed-form mathematically solution. Embodiments of the present invention employ a "Rubberband function" that incrementally detects a boundary from an underlying graphical image as will be discussed in greater detail below.

Data produced by image coding 101 and shape coding 102 is communicated via, for example, network 103. At the received system, the image is first decoded 104. The boundary of the respective object is then decoded 105 utilizing the reconstructed image data. Specifically, data defining the respective boundary includes a set of vertices. Each vertex represents a single point on the boundary. However, the set of vertices represents a relatively small subset of the points on the boundary. The Rubberband function detects the remaining points between the vertices by analysis of the reconstructed image data to "fill-in the missing points" of the boundary. Moreover, the parameters associated with each vertex limit the operations of the Rubberband function to cause the function to operate efficiently and to properly scale the analysis of the underlying graphical image as will be discussed in greater detail below.

When the image and the shape have been decoded, further processing 106 may occur as desired. This may include image processing by a user via a suitable multimedia application.

Figure 2:
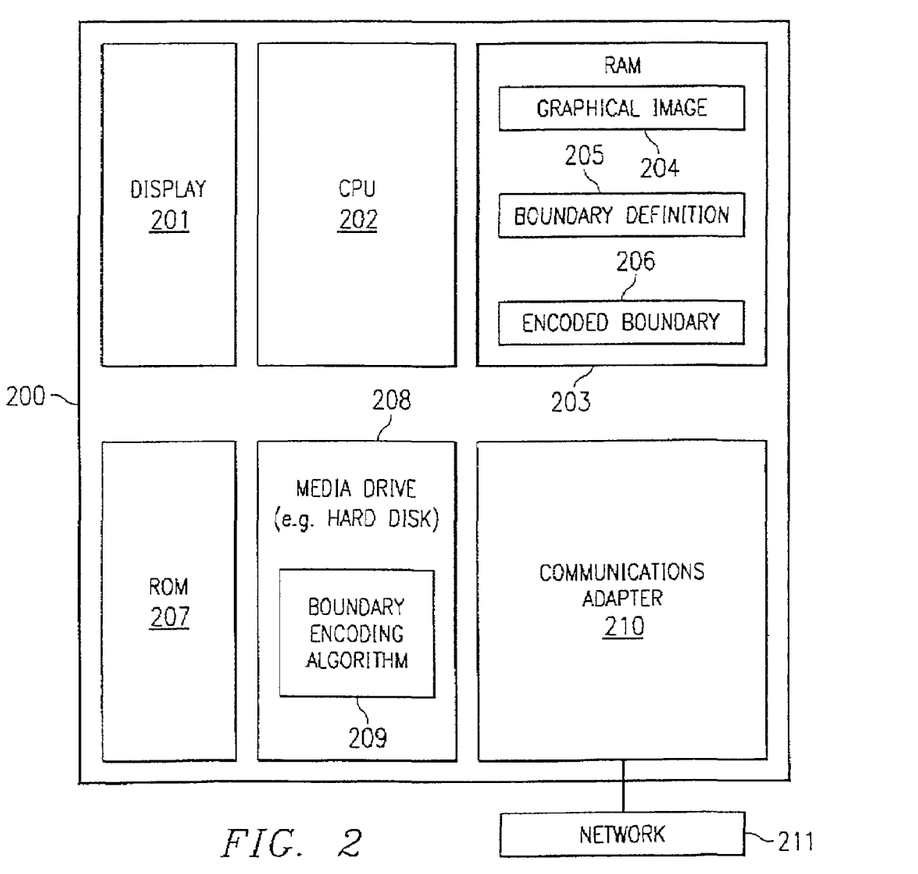
FIG. 2 depicts an exemplary computer system that may be utilized to implemented embodiments of the present invention.

FIG. 2 depicts a block diagram of exemplary computer system 200 to implement embodiments of the present invention. System 200 includes display 201 to present graphical information to a user. System 200 further includes central processing unit (CPU) 202 to execute software instructions. CPU 202 may be any general purpose CPU and the present invention is not restricted by the architecture of CPU 202 as long as CPU 202 supports the inventive operations as described herein.

Computer system 200 also includes random access memory (RAM) 203, which may be SRAM, DRAM, SDRAM, or the like. Computer system 200 includes ROM 207 which may be PROM, EPROM, EEPROM, or the like. RAM 203 and ROM 207 hold user and system data and programs as is well known in the art.

When implemented via executable instructions, various elements of the present invention are in essence the code defining the operations of such various elements. The executable instructions or code may be obtained from a readable medium (e.g., hard drive media, optical media, PROM, EPROM, EEPROM, tape media, cartridge media, and/or the like) or communicated via a data signal from a communication medium (e.g., the Internet). In fact, readable media can include any medium that can store or transfer information.

For example, embodiments of the present invention store executable instructions or code to define boundary encoding algorithm 209 (as described in greater detail below) on media drive 208 (e.g., a hard drive) in accordance with embodiments of the present invention. The executable instructions or code may be loaded into RAM 203 and executed by CPU 202. CPU 202 under the control of the executable instructions may process graphical image 204 and boundary definition 205 to produce encoded boundary 206 according to embodiments of the present invention.

Furthermore, computer system 200 comprises communications adapter 210 which is adapted to couple computer system 200 to a network 211, which may be one or more of telephone network, local (LAN) and/or wide-area (WAN) network, Ethernet network, and/or Internet network. Computer system 200 may communicate encoded boundary 206 to another system to permit the system to reconstruct the boundary from the communicated information according to embodiments of the present invention.

Figure 3:
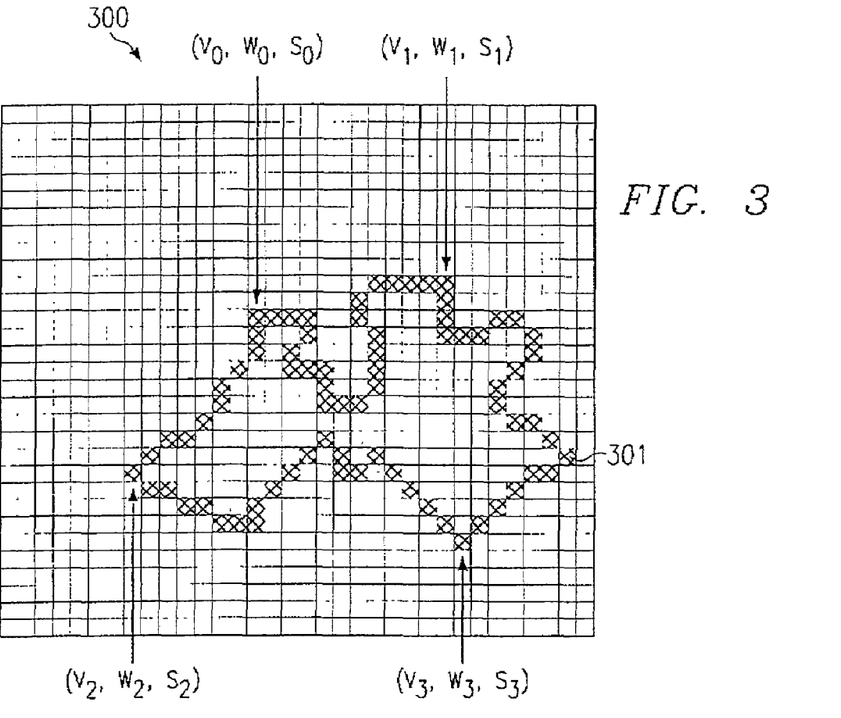
FIG. 3 depicts a graphical image including an exemplary boundary and exemplary vertices.

To aid the reader's understanding of embodiments of the present invention, reference is now made to FIG. 3 which depicts graphical image 300. Graphical image 300 includes boundary 301. Boundary 301 is represented as a relatively large set of pixels. As will be discussed in greater detail below, embodiments of the present invention select a set of vertices ($v_0$, $v_1$, $v_2$, and $v_3$ as shown in FIG. 3). Each vertex is associated with two parameters ($w_i$, $s_i$). The parameter "$w_i$" represents the width of the Rubberband function and the parameter "$s_i$" represents the scale of the Rubberband function. The Rubberband function utilizes the two parameters to define a path between adjacent vertices based upon analysis of the underlying graphical image. Because the Rubberband function analyzes the underlying graphical image, a significant coding improvement is achieved. Specifically, analysis of the underlying graphical image permits removal of the correlation between the underlying graphical image and the boundary definition.

Before discussing the encoding algorithm in greater detail, it is appropriate to discuss the Rubberband function. The Rubberband function is a function that incrementally detects a boundary between selected or identified points in a graphical image. An earlier implementation of the Rubberband function is described in greater detail in *Designing an Interactive Tool for Video Object Segmentation and Annotation*, ACM Multimedia 1999, Huitao Luo and Alexandros Eleftheriadis, which is incorporated herein by reference. Embodiments of the present invention utilize many of the features of the earlier iteration of the Rubberband function. Additionally, embodiments of the present invention may utilize additional inventive features such as the use of the scale parameter $s_i$.

Figure 4:
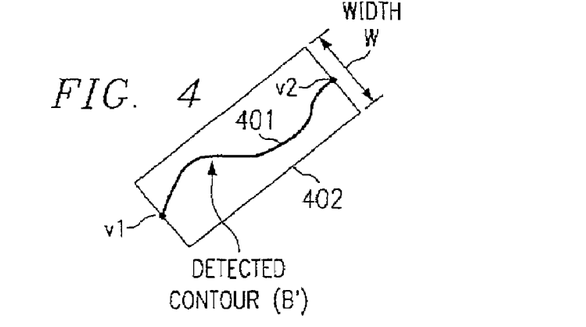
FIG. 4 depicts an exemplary boundary detected by the Rubberband function according to embodiments of the present invention.

FIG. 4 depicts an exemplary illustration of boundary 401 detected by the Rubberband function according to embodiments of the present invention. The detection process occurs by identifying two vertices ($v_1$ and $v_2$). In addition, two parameters are utilized to define the edge-detection operations of the Rubberband function. First, the parameter "w" is utilized as a spatial constraint to limit the search area associated with the detection process. The parameter "w" defines the width of rectangle 402 in which edge detection is performed. Secondly, the parameter "s" (not shown) is utilized to define the scale of the gradient function as will be discussed in detail below.

The Rubberband function utilizes two vertices, the supplied parameters and the underlying graphical image to detect a contour, $B'=(b'_0, b'_1, b'_2, b'_3, \ldots b'_n)$, where $b'_i$ is the $i^{th}$ pixel of the detected contour and $b'_0=v_1$ and $b'_n=v_2$. The contour (B') is detected by computing the shortest path between vertices ($v_1$ and $v_2$) based upon weights generated by the gradient of the underlying graphical image.

Figures 5, 11:
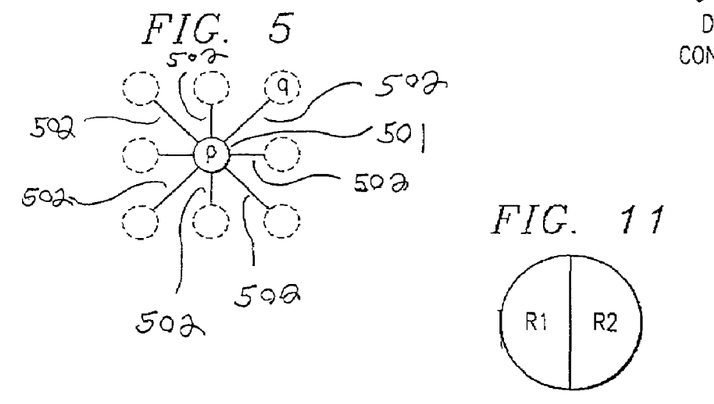
FIG. 5 depicts an exemplary pixel and its related edges according to embodiments of the present invention.
FIG. 11 depicts a region template for edge detection according to embodiments of the present invention.

Moreover, the Rubberband function models the image as a graph in which each pixel is a vertex and each vertex has only 8 edges linking to its 8 neighboring pixels (as is depicted by vertex 501 in FIG. 5). The basic procedure of Rubberband function contains two steps: a local feature computation step and a graph search step as follows.

In the first step, the local image gradient features are calculated by a scalable edge detection operator. The calculation of the image gradient determines the relative amount of change (e.g., change in gray scale or red/green/blue (RGB) values) in the local image at a given point. Moreover, the image gradient may be determined upon the basis of change over a local neighborhood. The purpose of the image gradient is to cause the shortest path analysis to be weighted such that paths associated with larger gradients are associated with lower distances or weights. For this purpose, a number of different operators may be used such as Laplacian with scalable kernels, Laplacian of Gaussian (LoG) operator, and/or the like. For each graph edge e(p,q) as shown in FIG. 5 as edges 502, the weight or local distance dist(p,q) may preferably be defined as:

$dist(p,q)=1/(gradient(q)+c)$, where $c$ is a small constant.

With the above weight definition, the image is converted into a directed and weighted graph. In this graph, the Rubberband function uses two vertices $v_1$, $v_2$ as two anchoring points. The edge detection problem, i.e., to detect the object contour from $v_1$ to $v_2$, is then processed as a shortest path search analysis. Specifically, the contour is detected by identifying the shortest distance path starting from $v_1$ and ending at $v_2$. This analysis may be performed by using Dijikstra's algorithm (see, e.g., T. H. Cormen, C. E. Leiserson, and R. L. Rivest, *Introduction to Algorithms*, chapter 25.2, MIT Press, 1990, the disclosure of which is hereby incorporated herein by reference.) or the Controlled Flooding algorithm that will be discussed in greater detail below as examples.

As previously noted, $v_1$ and $v_2$ determine the anchoring points for graph search and w is the width of the Rubberband, which, together with $v_1$ and $v_2$, defines the rectangle-shaped neighborhood in which the Dijkstra's search algorithm runs. This neighborhood definition effectively reduces the search complexity as well as improves the algorithm performance by removing influence of nearby strong irrelevant gradients. The parameter "$s_i$" determines the scale or neighborhood on which the image gradient is computed. Generally speaking, larger scales remove image texture noises while smaller scales offer improved spatial localization.

Though for the edge detection purpose, both w and s can be arbitrary valued as long as the detection result is acceptable for shape coding purposes. Moreover, w and s may be selected to represent the trade-off between rate and distortion. In embodiments, $w_i$ is selected from three values {1, 15, 31} and $s_i$ is selected from four values {1, 2, 4, 6}, (both in pixels). Therefore, both $w_i$ and $s_i$ (limited to these values) may be represented by a mere 2 bits of data to be encoded according to embodiments of the present invention. Further details regarding preferred code word design will be discussed in greater detail below.

Figure 6:
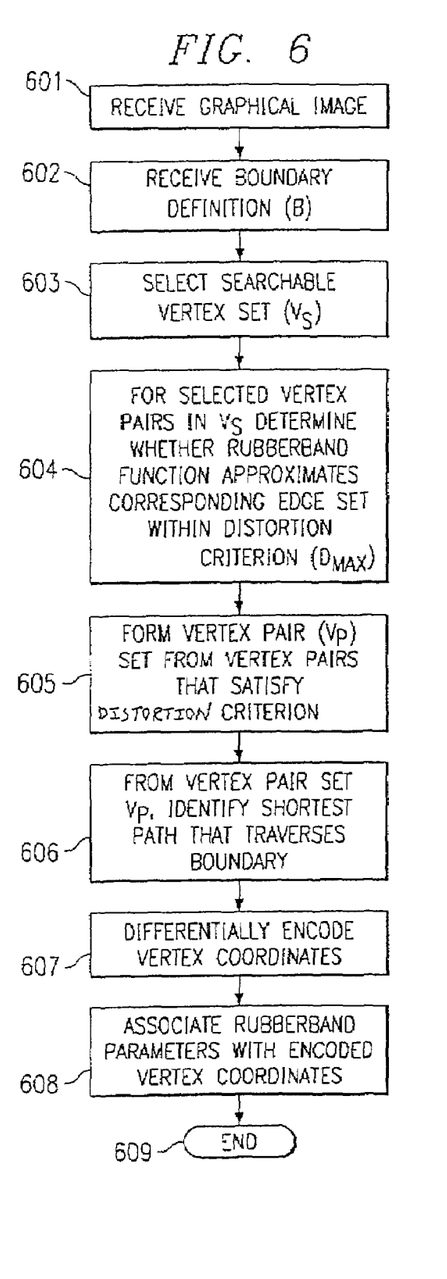
FIG. 6 depicts exemplary process flowchart 600 of boundary information processing steps according to embodiments of the present invention.

Before describing embodiments of the present invention in rigorous mathematical terms, reference is now made to FIG. 6 which depicts exemplary process flowchart 600. Process flowchart 600 describes boundary information processing at a relatively high level according to embodiments of the present invention.

In step 601, a graphical image is received. In step 602, a boundary definition of an object in the graphical image is received. For example, a user may specify each point or pixel of the boundary.

From the boundary definition, a searchable vertex set is identified (step 603). The searchable vertex set defines the permissible points in the boundary definition that may be utilized as vertices in the final boundary encoding data structure. The searchable vertex set preferably does not contain as many points or pixels as the boundary definition to reduce the complexity of the boundary encoding algorithm. As will be discussed in greater detail, various criteria may be employed to select the points from the boundary definition to form the searchable vertex set.

In step 604, for selected vertex pairs in the searchable vertex set, it is determined whether the Rubberband function approximates a respective portion or "edge" of the boundary definition between the respective vertex pair with a sufficient degree of accuracy. The analysis of vertex pairs in the searchable vertex set is preferably limited to selected pairs to reduce the complexity of the algorithm. The criteria of the selection of vertex pairs for the distortion analysis will be discussed in greater detail below.

The determination performed in step 604 is intended to measure the distortion or shape difference between two contours. For this purpose, a number of metrics are applicable. In preferred implementations, the area difference metric is used. In this case, the determination in step 604 measures whether the closed-area, between the contour detected by the Rubberband function for a respective selected vertex pair and the set of points in the boundary definition between the vertex pair, is less than a distortion criterion ($D_{max}$). For example, assume that the $v_{20}$ and $v_{35}$ are vertices in the seachable vertex set. Further assume that $v_{20}=b_{57}$ and $v_{36}=b_{72}$ (i.e., $v_{20}$ corresponds to $b_{57}$ in the boundary definition and $v_{36}$ corresponds to $b_{72}$ in the boundary definition). If $v_{20}$ and $v_{35}$ satisfy the distortion criterion ($D_{max}$), this means that $v_{20}$ and $v_{35}$ (with their respective parameters w, s) may be utilized to approximate the respective edge of the boundary information defined by points $b_{57}$ through $b_{72}$ via the processing of the Rubberband function.

In step 605, a vertex pair set ($V_p$) is formed from the vertex pairs that were determined to satisfy the distortion criterion ($D_{max}$) in step 604. Alternatively, in lieu of segregating vertex pairs according to the distortion criterion, vertex pairs that do not satisfy the distortion criteria may be assigned a distance or weight of infinity to eliminate their consideration from the shortest path analysis (see step 606 below).

From the vertex pair set ($V_p$), the shortest path that traverses the boundary is identified in step 606. As discussed above, each vertex pair that satisfies the distortion criterion may be utilized to approximate the respective edge associated with the respective vertex pair. The shortest path is the path that traverses the entire boundary with the smallest number of vertices. The vertices of the shortest path are designated as the set $V_f$.

The vertices in $V_f$ are differentially encoded in step 607 as will discussed in greater detail below. In step 608, the respective parameters w and s are associated with differentially encoded vertices of $V_f$ to form the encoded boundary data structure according the embodiments of the present invention. In step 609, the process flow ends.

To describe embodiments of the present invention in greater mathematical detail, it is appropriate to define several terms. The set $B=\{b_0, b_1, b_2, b_3, \ldots b_n\}$ is the boundary definition where $b_i$ is the $i^{th}$ pixel of the boundary. Given two points ($b_k$ and $b_l$) in B such that l>k, an edge is defined as points $b_k$ through $b_l$ (inclusive of $b_k$ and $b_l$).

Figure 7:
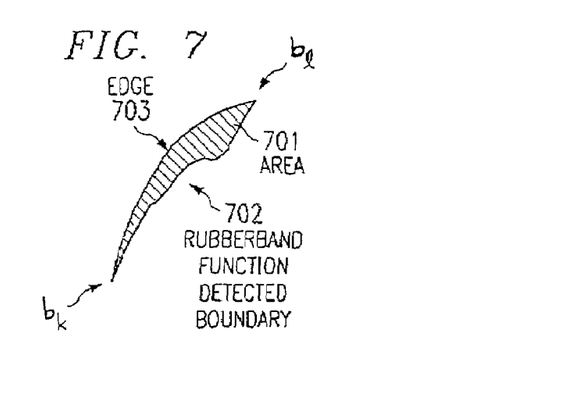
FIG. 7 depicts an exemplary difference area defined by an edge and a Rubberband function detected boundary according to embodiments of the present invention

An edge distortion function ($d(b_k, b_l)$) is defined to measure the difference between the edge associated with points $b_k$, $b_l$ and the detected boundary identified by the Rubberband function. As noted before, we can use the area size of the enclosed region by the edge and the detected boundary may be utilized as the selected metric to measure the distortion. For the convenience of the reader, FIG. 7 graphically illustrates area 701 defined by edge 703 and Rubberband function detected boundary 702 (both of which include points $b_k$ and $b_l$). However, it shall be appreciated that other suitable metrics may be utilized according to embodiments of the present invention.

In general terms, the coding analysis finds the optimal representation of boundary definition (B) in the form of an ordered vertex set $V_f=\{v_0, v_1 \ldots v_{N_v-1}\}$ and its corresponding edge set $E=\{e_i:e_i=e(v_i, v_{i+1}), i=0,1, \ldots, N_v-2, v_i \in V\}$. Here $v_i$ is the $i^{th}$ vertex, $N_V$ is the total number of vertices in $V_f$, and $e_i$ is the $i^{th}$ edge in E. In this representation, each edge $e_i = e(v_i, v_{i+1})$ is associated with a quadruplet:

$$(f_i, p_i, v_i, v_{i+1}), (i=0,1,\ldots,N_v-2)$$

where $f_i$ is a function, which is one of a predetermined function set $F=\{f^{(0)}, f^{(1)}, \ldots\}$, and $(p_i, v_i, v_{i+1})$ are the parameters used by the function $f_i$ to generate a contour $B'_i = \{b_0^{(i)}, b_1^{(i)}, \ldots, b_j^{(i)}\}$. Note $p_i$ denotes in general the parameters used by $f_i$ in addition to the vertex parameters $v_i$ and $v_{i+1}$. $B'_i$ is considered the partial representation of the boundary B. When concatenated together, the contours $B'_0, B'_1, \ldots, B'_{N_v-2}$ constitute a boundary $B' = \{B'_0, B'_1, \ldots, B'_{N_v-2}\}$, which is considered the approximated representation of boundary B.

The optimization problem may be formulated in a typical rate and distortion sense. Let $r(f_i, p_i, v_i, v_{i+1})$ denote the rate (e.g., the bit rate) used to encode edge $e(v_i, v_{i+1})$. The coding rate for the whole boundary is then $$R = \sum_{i=0}^{N_v-2} r(f_i, p_i, v_i, v_{i+1}).$$

The optimization is therefore formulated as:

$$\min_{\{f_1 \in F, p_i \in P, v_i \in V, i=0,1,\ldots,N_v-1\}} R(f_0, p_0, v_0; f_1, p_1, v_1; \ldots; f_{N_v-1}, p_{N_v-1}, v_{N_v-1})$$

subject to $$D(f_0, p_0, v_0; f_1, p_1, v_1; \ldots; f_{N_v-1}, p_{N_v-1}, v_{N_v-1}) = \text{diff}(B, B') < D_{max}$$

Note, F, P, V refer to the searchable or admissible sets from which $f_i, p_i, v_i$ are selected respectively. In addition, the shape difference function diff(B, B') measures the coding distortion between B and B'. It may be associated with edge distortion $d(b_k, b_l)$) in two ways. The first one is the maximum operator:

$$\text{diff}(B, B') = \max_{i=0,1,\ldots,N_v-2}(d(v_i, v_{i+1}))$$

and the second one is the summation operator:

$$\text{diff}(B, B') = \sum_{i=0}^{N_v-2}(d(v_i, v_{i+1}))$$

Before this point, embodiments of the present invention have been described which implementing the maximum operator for the convenience of describing embodiments of the present invention to the reader. Although the summation operator is somewhat conceptually more involved, the summation operator is relatively straightforward to implement according to further embodiments of the present invention (see, e.g., G. H. Schuster and A. K. Katsaggelos, *An Optimal Polygonal Boundary Encoding Scheme in the Rate Distortion Sense*, IEEE Trans. Image Processing, vol.7, no.1, 1998, the disclosure of which is hereby incorporated herein by reference).

The optimization problem formulated above is modeled as a shortest path graph search problem and solved with dynamic programming (DP). The basis for graph modeling is the fact that both the coding rate and the distortion for each edge can be determined locally.

The ordered vertex set $V_f$ is searched out of the vertex set B, while the functions $f_i$ and parameters $p_i$ are searched out of Rubberband's definition space. As previously noted, the admissible parameter set P is preferably limited by selecting $w_i$ from three values $\{1, 15, 31\}$ and selecting si from four values $\{1, 2, 4, 6\}$. Given two arbitrary vertices $b_k, b_l$ from B, the rate needed to code the edge from $b_k$ to $b_l$, is determined as:

$$r(e(b_k, b_l)) = r(f^*, p^*, b_k, b_l)$$

where $(f^*, p^*)$ is determined by:

$$(f^*, p^*) = \arg\min_{(f \in F, p \in P)} d(f, p, b_k, b_l)$$

where function d( ) is the distortion function defined above. Accordingly, it follows that the function and parameter search may be separated from the vertex search. Moreover, the weight for a given edge $e(b_k, b_l)$ can be uniquely determined by vertices $b_k$ and $b_l$. We can therefore define the weight $(w(b_k, b_l))$ for a given edge as follows:

$$w(b_k, b_l) = r(b_k, b_l) \text{ if } d^*(b_k, b_l) < D_{max}, \infty \text{ otherwise}$$

where $$d^*(b_k, b_l) = d(f^*, p^*, b_k, b_l)$$

with $f^*, p^*$ defined as discussed above. With the weight definition, a weighted directed graph G is defined with vertex set V=B and edge set $E=\{(b_k, b_l), \forall k \neq l\}$. The optimization problem defined above may then be formulated as a shortest path problem in graph G as follows. It is first assumed that the first vertex $v_0 = b_0$ is already determined, and the rate used to encode the first i vertices $\{v_0, \ldots v_i\}$ of the optimal solution $V_f$ and respective edges $\{e(v_0, v_1), \ldots, e(v_{i-1}, v_i)\}$, is denoted as $R_i$.

Then it follows that:

$$R_i = \sum_{k=0}^{i-1} r(v_k, v_{k+1}) = \sum_{k=0}^{i-1} w(v_k, v_{k+1})$$

corresponding to the shortest path from $v_0 = b_m$ to $v_i = b_n$ in graph G (otherwise $V_f$ is not the optimal solution as is assumed). Therefore, the problem can be solved incrementally by finding the shortest path from $v_0 = b_0$ to $v_i = b_n$, n=1, 2, ..., $N_B-1$. Note $b_{N_B-1} = b_0$ in case of a closed boundary B. We also have $v_{N_v-1} = v_0$. In order to find the global minimization, the first vertex $v_0$ of V could be moved over every vertex position in B with the corresponding $R_{N_v-1}$ compared.

Accordingly, the minimization problem is solved in mathematical terms. However, the shortest path search based solution in its raw form has appreciable complexity because: each round of the shortest path search has complexity of $\theta(|V|^2 + |E|)$, while changing the first vertex $v_0$ over every possibility further increases it to $\theta(|V|^3 + |E| \cdot |V|)$. Therefore the following constraints and heuristics are preferably utilized to reduce the complexity.

The first vertex $v_0$ is determined as the point in B that has the highest curvature. For ease of discussion, B is relabeled to make $v_0=b_0$. This heuristic reduces the complexity of the shortest path search to $\theta(|V|^2+|E|)$ with little effect on coding quality.

The edge set of G is limited to be E={$(b_k, b_l)$, k<l}. This causes G to be a weighted, directed acyclic graph and the search complexity is further reduced to $\theta(|V|+|E|)$.

For each point $b_l$ in B, possible edges $e(b_k, b_l)$ in G are further constrained by requiring $(l-k)<L_s$, where $L_s$ is a constant determined by heuristics. This requirement makes $|E|=L_s\cdot|V|$ and the complexity becomes $\theta(L_s\cdot|V|)$.

The vertex number of G is preferably reduced by subsampling the points in the boundary definition B by two ways. First, a vertex set $B^{(s)}=\{b_0^{(s)}, \ldots, b_N^{(s)}\}$ is preferably obtained by setting $b_0^{(s)}=b_0$ and growing recursively as follows. Suppose $b_i^{(s)}=b_k$, $b_k \in B$ is determined, then $b_{i+1}^{(s)}=b_l$ is determined by looking for $b_l \in B$ that maximizes l, subject to $0<(l-k)<n$, and $d^*(b_k, b_l)<D_{max}$, where $d^*( )$ is the distortion function as defined above, and $n_s$ is a constant set by heuristics. Second, another vertex set $B^{(c)}=\{b_0^{(c)}, \ldots, b_{N_c}^{(c)}\}$ is determined by identifying points in B that have a local curvature higher than a predetermined threshold. The final or searchable vertex set of G is then defined as $V=B^{(s)} \cup B^{(c)}$. Generally speaking, if V is subsampled by n, the complexity will become $$\theta\left(\frac{L_s \cdot |V|}{n^2}\right).$$

In general terms, the coding element for the boundary information encoded according to embodiments of the present invention is the quadruplet $(f_i, p_i, v_i, v_{i+1})$. In accordance with embodiments of the present invention, the coding element may preferably be represented by the coding quadruplet of $(r_i, c_i, w_i, s_i)$, where $(r_i, c_i)$ is the row and column coordinate of vertex $v_i$, and $w_i$ and $s_i$ are the Rubberband width and scale corresponding to edge $e(v_i, v_{i+1})$ respectively. To remove additional redundancy, the vertex coordinates are preferably coded differentially in the form of $(dr_i, dc_i, w_i, s_i)$, where $dr_i=r_i-r_{i-1}$, $dc_i=c_i-c_{i-1}$.

TABLE 1 below depicts exemplary code words that may be utilized to encode a boundary according to embodiments of the present invention. Furthermore, TABLE 2 depicts an exemplary bit stream syntax used to save the coded shape data into a binary file (or to stream them over a network) according to embodiments of the present invention.

TABLE 1

| Code Word | Bit Length | Description |
| --- | --- | --- |
| 00 + dr[int(l)] + dc[int(l)] | 2 + 2 * l | Rubberband width = 1 (scale is not necessary) |
| 01 + s[uint(2)] + dr[int(l)] + dc[int(l)] | 4 + 2 * l | Rubberband width = 15 |
| 10 + s[uint(2)] + dr[int(l)] + dc[int(l)] | 4 + 2 * l | Rubberband width = 31 |
| 111 | 3 | End of the Boundary (EOB) |
| 110 + len[uint(4)] | 7 | The following is the chain code description of length = len |

TABLE 2

| | |
| --- | --- |
| the first vertex (absolutely code) | r[int(16)] + c[int(16)] + w[uint(2)] + s[uint(2)] |
| bit width of the differential coordinates code | l[uint(3)] |
| the second vertex | w + s + dr[int(l)] + dc[int(l)] |
| ... | |
| the last vertex | w + s + dr[int(l)] + dc[int(l)] |
| end of boundary | EOB |

Note r[int(16)] refers to coding the integer variable "r" with 16 bits, while w[uint(2)] means to code the unsigned integer variable "w" with 2 bits. In embodiments of the present invention, to code an integer x with bit length l is implemented by adding x with $2^{(l-1)}$ to map it to $[0,2^l)$, while to code an unsigned integer with bit length l involves saving its leftmost l bits. In Table 2, the bit length l used to code differential coordinate (dr,dc) is determined by finding the absolute maximal of them over the whole vertex set V. It is also appropriate to note that, although the bitstream syntax described in Table 2 only describes one object (boundary), it is straightforward to extend it into multiple object formats.

Embodiments of the present invention provide numerous advantages over known boundary or shape encoding algorithms. Specifically, embodiments of the present invention enable a boundary to be encoded with a significantly reduced amount of information. Specifically, a minimal number of vertices may be selected to represent the boundary. The minimal number of vertices are sufficient to describe the boundary, because embodiments of the present invention reconstruct the boundary from the minimal number of vertices and the underlying image. Accordingly, embodiments of the present invention are operable to remove the correlation between the boundary data and the underlying image data thus achieving the desired coding efficiency. Embodiments of the present invention further enable removal of the correlation between the boundary data and the underlying image data without requiring a closed-form mathematical representation. Moreover, embodiments of the present invention further reduce the complexity of the encoding process by producing a searchable vertex set and by limiting the potential edge sets to thereby achieve processing efficiency suitable for user-oriented applications.

Figure 8:
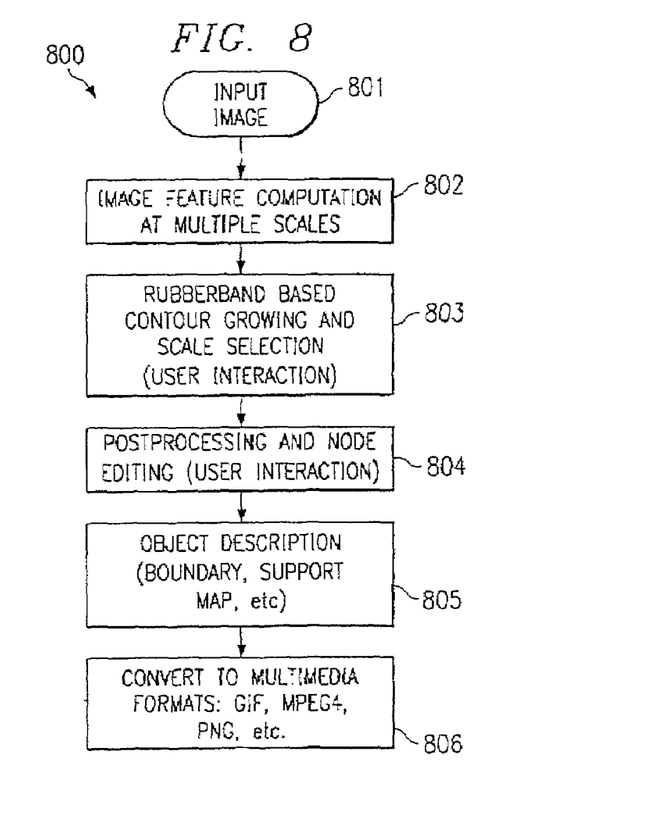
FIG. 8 depicts an exemplary flowchart illustrating defining an object boundary according to embodiments of the present invention.

In addition to encoding a boundary in an efficient manner, the Rubberband function may be utilized to define a boundary in association with user input. FIG. 8 depicts exemplary flowchart 800 which depicts creation of a boundary definition utilizing the Rubberband function and user interaction according to embodiments of the present invention. In step 801, the input image is received. The input image may be one of any number of suitable graphical formats. In step 802, the input image (either grayscale or color representation) is first processed by a scalable edge detector. Gradients are advantageously computed in multiple scales.

In step 803, the Rubberband user interface is utilized to grow contours utilizing user interaction and automatic scale selection. Specifically, the user selects a plurality of vertices over the boundary of the respective object in the graphical image. In step 803, as the user manipulates the user interface with a mouse peripheral, for example, the corresponding contour is automatically displayed based on the available local gradient information. As previously noted, the Rubberband function detects a contour between two anchor points or vertices. Additionally, the Rubberband function limits its search analysis to a rectangular area defined by the two anchor points and a width parameter. The user interface allows the user to select the anchor points and the width parameter. Moreover, the scale parameter is automatically determined from user interaction as will be discussed in greater detail below. When the detected contour matches the boundary segment as defined by user input, the control points (the respective vertex pair) may be fixed by suitable input from the user (e.g., one or several mouse clicks). This interactive process is repeated until a closed boundary is defined.

In step 804, post-processing and node editing of the closed boundary may be performed utilizing additional user interaction. In step 805, an object description data structure (e.g. boundary definition, support map, and/or the like) is created to define the object selected by the user. In step 806, the graphical information (i.e. the input image and the object description data structure) may be converted into a suitable format including, but not limited to, graphics interchange format (GIF), MPEG-4, Portable Network Graphics (PNG), and/or the like.

In accordance with embodiments of the present invention which define an object boundary in association with user input, an implementation of the Rubberband function may be referred to as a "Controlled Flooding" algorithm. The Controlled Flooding algorithm is an improvement over Dijikstra's search algorithm as it is more robust to the presence of neighboring noises. Moreover, it shall be appreciated that the adaptive threshold was not disclosed in early publications (e.g., *Designing an Interactive Tool for Video Object Segmentation and Annotation*, ACM Multimedia 1999,) that discussed other implementations of the Rubberband function. In Controlled Flooding algorithm, an adaptive threshold T is used to control the graph search process. If the original local distance of any pixel pair is greater than T, the distance is set to infinity. In this manner, the graph search is prohibited from reaching these points. As will be discussed in greater detail below, the definition of the local distance in this work causes this thresholding measure to be equivalent to prohibiting the graph search from reaching regions with weak gradients.

The algorithm starts from one control point and repeats the search process with the controlling threshold increased by $\delta_T(\delta_T>0)$, until the search process arrives at the other control point. In this manner, strong neighboring edges have less probability of distracting the search algorithm from detecting the actual contour if the strong neighboring edges are not connected to the two control points by strong edges.

Figure 9A:
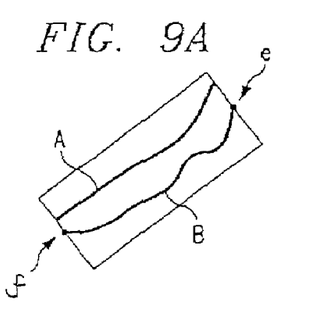
FIGS. 9A-9C depict exemplary contours associated with and without use of an adaptive threshold value to control a graph searching process according to embodiments of the present invention.
Figure 9B:
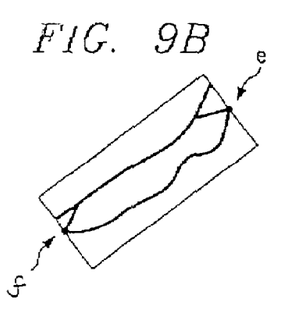
Figure 9C:
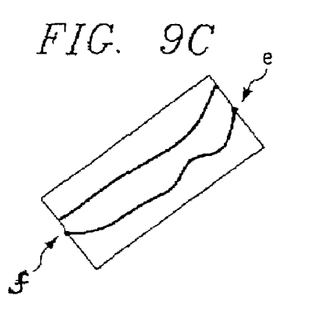

This concept is illustrated in FIGS. 9A-9C. In FIG. 9A, a neighbor pattern is depicted. The user selected two control points: f and e, with contour B as the desired result. However, since another contour, A, is in the neighborhood, and A has stronger gradients, the graph search result is attracted to contour A when global minimization is obtained, as depicted by FIG. 9B. This is a common problem that frequently occurs if Dijkstra's algorithm is used. However, when the Controlled Flooding algorithm is applied, the graph search cannot reach contour A because search paths from the control points f and e to points on contour A are prohibited by the threshold T. The successful search result is shown in FIG. 9C.

To describe the Controlled Flooding algorithm in greater detail, it is appropriate to define an assistant data structure and related functions. The data structure L is an active list that is used to guide the search process. The following four functions are defined for L:

1. push(L, p, d) is used to save the pixel p and its cumulative path distance (from the start point) d=C(p) in the list;
2. pop(L, p) is used to retrieve the pixel p whose cumulative path is the smallest in the current list;
3. num(L) is used to return the number of pixels saved in the list; and
4. remove(L, p) is used to remove the pixel p from the list, if p is in the list.

Various implementations may be utilized to implement these functions depending upon the data structure utilized to implement L. An exemplary implementation of the data structure L is a list sorted with respect to a pixel's cumulative path distance d. To improve insert and retrieval performance, other sorting structure may be utilized such as a "bucket" structure which is well known in the art.

Suppose p,q are two 8-connected pixels, function Dist(p, q) defines the local distance between them (an exemplary definition of function Dist( ) will be described in greater detail below). N(p) denotes the 8-connected neighbor set of pixel p. Further, let ptr(p) be the optimal path pointer for pixel p, i.e., ptr(p) points to its previous pixel on the optimal path. Then the controlled-flooding algorithm can be expressed in the pseudo code of FIG. 10.

Figure 10:
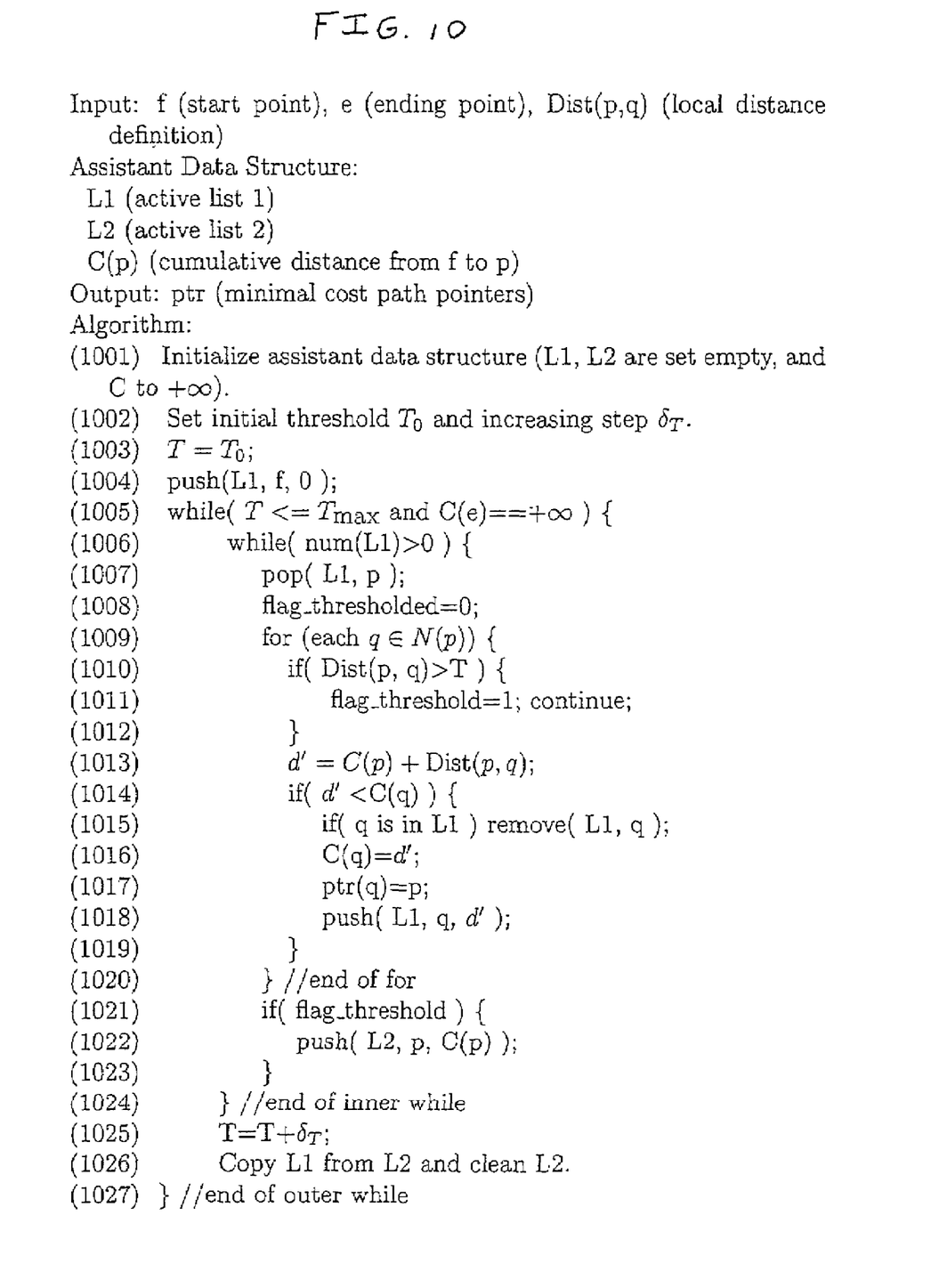
FIG. 10 depicts exemplary psuedo code that detects a contour between identified vertices according to embodiments of the present invention.

In the pseudo code of FIG. 10, steps 1001-1004 initialize the assistant data structures. Steps 1005-1027 perform the search analysis. Among these steps, steps 1006-1024 are the constrained search function (constrained by the current threshold T). Steps 1010-1012 perform the threshold comparison and the variable "flag_threshold" is set if the growing is limited by the threshold. In steps 1021-1023, the current pixel is pushed into the backup active list (L2) if the "flag_threshold" is set. The purpose of this operation is to save this pixel as possible start pixels for future process. When all the pixels in the current active list (L1) are processed (i.e., the graph is grown as much as the current threshold permits), the threshold is raised by $\delta_T$ in step 1025 and the backup active list (L2) is moved to current active list (L1) and the whole process is repeated, until the other anchoring point e (ending point) is reached.

An important issue to maintaining the accuracy of the graph search process is to define an appropriate local distance definition for function Dist(p,q). Conceptually, this function should be related to the magnitude and the orientation of the edge gradients at the pixels p,q. However, the user's subjective understanding of an edge may differ from signal discontinuity in image grayscale or RGB components. A highly textured region could be considered as "homogeneous" and strong gradients associated with its textures are not regarded as "edges" from the perspective of the user. The reason is that the definition of "homogeneity" varies depending on different scales of observation. In order to generate segmentation results that are consistent with user expectation, appropriate scale selection is advantageous.

To achieve this goal, the neighboring area defined by the Rubberband is utilized. Because the user has the control of the size and location of this Rubberband rectangle (so as to make sure the interested boundary segment is located inside the Rubberband), the user also implicitly indicates the scale in which the user observes the object. Therefore, analysis of the image feature within this neighboring area facilitates determination of the intended scale. Accordingly, a MDL (minimal description length) principle based algorithm performs the automatic scale selection.

In accordance with embodiments of the present invention, a region-based edge detector is utilized. The region-based edge detector is a scalable operator that computes edge strength based on different neighbor sizes. The region-based edge detector demonstrates greater spatial localization than traditional scalable operators such as Laplacian and Laplacian of Gaussian (LoG). Although the region-based edge detector is preferred, traditional scalable operators may be utilized according to embodiments of the present invention in association with automatic scale selection.

In a region-based edge detector, edges are detected as boundaries between different regions. As depicted in FIG. 11, for a pixel p, its edge gradient is analyzed over three regions: $R=R_1+R_2$, $R_1$ and $R_2$. A region homogeneity function $H(\cdot)$ is defined and the gradient magnitude is defined as: $mag=\frac{1}{2}[H(R_1)+H(R_2)]-H(R)$. To detect gradients utilizing different angles, the region templates may be rotated into $R(\theta)$, $R_1(\theta)$ and $R_2(\theta)$. The final gradient (magnitude and orientation) is then defined as:

$$mag = \max_\theta \left\{ \frac{1}{2}[H(R_1(\theta)) + H(R_2(\theta))] - H(R(\theta)) \right\}$$

$$ori = \operatorname*{argmax}_\theta \left\{ \frac{1}{2}[H(R_1(\theta)) + H(R_2(\theta))] - H(R(\theta)) \right\}$$

The exact gradient definition depends on the definitions of homogeneity function $H(\cdot)$ and neighbor region templates $R$, $R_1$, and $R_2$. In embodiments of the present invention, $R$ is a disk and $R_1$ and $R_2$ are each a half disk centered on the respective pixel. Orientation is computed over four angles uniformly subsampled from the range $[0,\pi)$. The radius of the disk is used to represent the scale factor s of the edge detector. With scale factor s included, the preceding magnitude and orientation equations may be expressed as:

$$mag(s) = \max_\theta \left\{ \frac{1}{2}[H(R_1(s, \theta)) + H(R_2(s, \theta))] - H(R(s, \theta)) \right\}$$

$$ori(s) = \operatorname*{argmax}_\theta \left\{ \frac{1}{2}[H(R_1(s, \theta)) + H(R_2(s, \theta))] - H(R(s, \theta)) \right\}$$

The homogeneity function $H(\cdot)$ may be designed in a more flexible manner. In accordance with embodiments of the present invention, the standard deviation measure is utilized, although any number of other suitable measures may be utilized. The standard deviation measure may be expressed as:

$$H(R) = \left[ \frac{\sum_{v_i \in R} \|v_i - \overline{v}\|}{pixelnum(R)} \right]^{0.5}$$

where $v_i$ is the pixel feature vector, $\|\cdot\|$ is the Euclid norm. $\overline{v}$ is defined as:

$$\overline{v} = \frac{\sum_{v_i \in R} v_i}{pixelnum(R)}$$

Depending on different image types, the length of the feature vector v could be one (grayscale), three (RGB), or n (multi-spectral).

For a specific operator scale s, the local distance measure is defined based on the gradient definition as set forth above. Let $\vec{g}(p)$ be the gradient vector at the point p, $\vec{a}(p,q)$ be the unit vector perpendicular to vector p-q (as previously discussed, orientation is computed in the range of $[0,\pi)$ and, hence, all the vectors mentioned in this section are mapped to this range). The gradient is first linearly mapped to make its magnitude in the range of $[0,1]$ by:

$$\vec{g}(p) \Leftarrow \left( \frac{\|\vec{g}(p)\| - g_{\min}}{g_{\max} - g_{\min}} \right) \cdot \frac{\vec{g}(p)}{\|\vec{g}(p)\|},$$

where $g_{max}$ and $g_{min}$, are each the maximal and the minimal gradient magnitude over the whole image. The local distance between two neighboring pixel pair p and q is then defined as:

$$Dist(p,q) = Dist_{mag}(p,q) + Dist_{ori}(p,q)$$

where $Dist_{mag}(p,q)$ is defined as:

$$Dist_{mag}(p,q) = (1 - \|\vec{g}(q)\|)$$

and $Dist_{ori}(p,q)$ is defined as:

$$Dist_{ori}(p, q) = \omega_1 \left\langle \frac{\vec{g}(p)}{\|\vec{g}(p)\|}, \frac{\vec{g}(q)}{\|\vec{g}(q)\|} \right\rangle + \omega_2 \left\langle \frac{\vec{g}(p)}{\|\vec{g}(p)\|}, \vec{a}(p,q) \right\rangle + \omega_2 \left\langle \frac{\vec{g}(q)}{\|\vec{g}(p)\|}, \vec{a}(p,q) \right\rangle$$

where $w_1$, $w_2$ are weighting factors and $\langle,\rangle$ is dot product operation.

Accordingly, by utilizing the described scalable edge detector and local distance definition with the Controlled-Flooding algorithm, a contour c(s) may be generated on scale s linking two anchor points f and e. The remaining issue is then to select the appropriate scale s to execute the algorithm.

From a design point of view, contour results from smaller scales are more accurate spatially but sensitive to textured neighborhood, while results from higher scales are better in separating textured regions but may lose spatial accuracy. Since this edge-oriented algorithm is a localized solution, the MDL principle is employed to combine a global measure to balance the localized bias in the final result.

From a design point of view, contour results from smaller scales are more accurate spatially but sensitive to textured neighborhood, while results from higher scales are better in separating textured regions but may lose spatial accuracy. Since this edge-oriented algorithm is a localized solution, the MDL principle is employed to combine a global measure to balance the localized bias in the final result.

In the general sense, MDL principle is formulated as:

$$\min_\theta DL(X) = -\log P_\theta(x) + DL(\theta)$$

where x is the input data to be described/coded and $\theta$ is the modeling parameter, $P_{74}(x)$ is the statistical distribution of x given θ, and log $P_{74}(x)$ and $DL(\theta)$ are the description/coding length for the data and the modeling parameters. According to the MDL principle, the optimal data modeling method is selected from multiple models by minimizing the sum of coding length of the data and of the modeling parameters.

To associate this principle with contour analysis, embodiments of the present invention consider that the contour c(s) separates the Rubberband defined neighborhood into two regions $R_1$ and $R_2$, as depicted in FIG. 11. The input data is the pixel colors in the neighborhood, while the modeling parameter includes: (1) the segmentation contour c(s), (2) the modeling data that describes the statistical distributions of pixel colors in region $R_1$ and $R_2$ respectively. If it is assumed the each pixel color component in each region is spatially independent and share identical gaussian distribution, the MDL equation is converted into a close form:

$$DL = N_1 \cdot \log \sigma_1 + N_2 \cdot \log \sigma_2 + DL(c(s)) + \text{constant}$$

where $\sigma_1$ and $\sigma_2$ are the standard deviations of pixel colors of region $R_1$ and $R_2$ respectively, and $DL(c(s))$ is the coding length of the contour c(s). The first two terms are global homogeneity measures while the last term is the boundary smoothness measure.

The final segmentation result is therefore selected from the contour c(s) that yields the minimal value from the derived MDL equation. In operation, embodiments of the present invention preferably compute candidate segmentation contours in four scales: 1, 2, 4, 6 (pixels). The potential scale parameters are limited to a particular subset as a trade-off between complexity and performance. The MDL equation is applied to each candidate segmentation contour. The final segmentation result (the result associated with the selected scale) is the candidate that minimizes the MDL equation.

Figure 12:
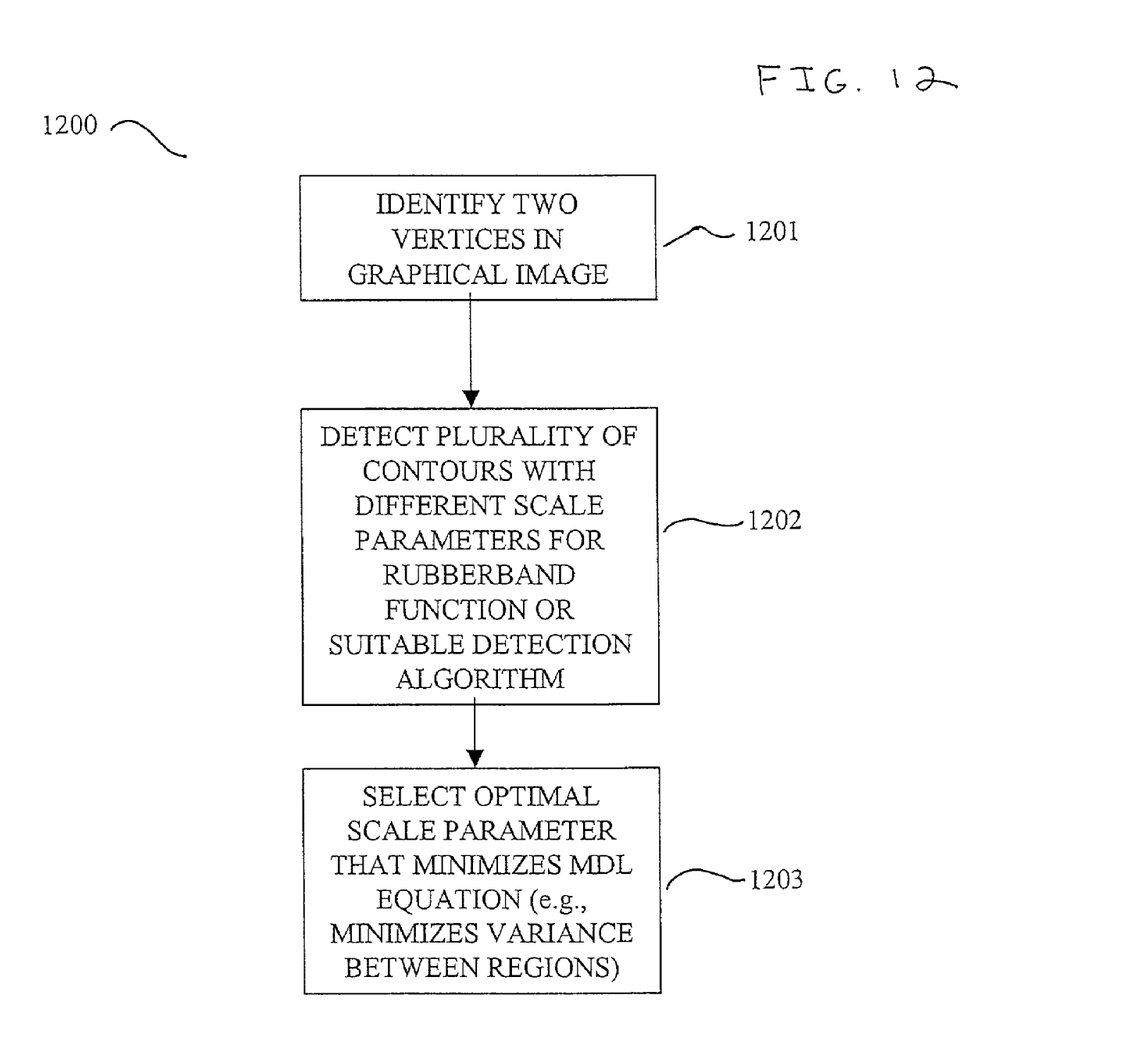
FIG. 12 depicts a flowchart to automatically select a scale parameter according to embodiments of the present invention.

FIG. 12 depicts flowchart 1200 that illustrates automatic selection of the scale parameter s. In step 1201, two vertices of the graphical image are identified (e.g., by a user). In step 1202, a plurality of contours are detected between the two vertices with each contour being associated with a different scale parameter. In step 1203, the scale parameter that minimizes the MDL equation (for example, by minimizing the variance between regions defined by the contour) is selected as the optimal scale parameter.

Embodiments of the present invention provide several advantages when utilized to define a boundary of an object in association with user interaction. Specifically, embodiments of the present invention achieve greater consistency with subjective user expectations by employing automatic scale selection. Specifically, the scale is analyzed within the rectangular area defined by the user when initializing the Rubberband function between two anchor points. Accordingly, the automatic scale selection is performed in accordance with the user's subjective perception of the boundary. In particular, the disclosed automatic scale selection exhibits superior performance when detecting a contour associated with a textured image. In addition, embodiments of the present invention are less likely to produce anomalous results due to strong neighboring edges by employing an adaptive-threshold search criterion to achieve greater spatial accuracy.

The invention claimed is:

1. A physical computer-readable medium comprising code for processing boundary information of a graphical object, the code comprising:
   code for receiving a graphical image that comprises said graphical object wherein said graphical object is defined by at least said boundary information;
   code for detecting a plurality of contours between respective pairs of points of said graphical image, wherein individual ones of the contours are detected responsive to respective user input of a user, and wherein said code for detecting comprises a predetermined function operable to calculate gradients associated with said graphical image, wherein said calculated gradients are calculated over respective spatial areas of said graphical image limited by a scale parameter; and
   code for determining a plurality of vertices from said boundary information, wherein respective contours, which are between adjacent vertices of said plurality of vertices and are detected by said code for detecting, approximate respective edges of said boundary information within a distortion criterion.

2. The medium of claim 1 further comprising:
   code for creating an approximated boundary utilizing at least said graphical image, said plurality of vertices, and said code for detecting.

3. The medium of claim 1 wherein said code for detecting is operable to determine a shortest path between said pair of points, wherein said shortest path is weighted by said calculated gradients.

4. The medium of claim 3 wherein said code for detecting limits its determination of the shortest path to a rectangular area defined in part by a width parameter.

5. The medium of claim 1 wherein said code for detecting implements a Rubberband function in executable instructions.

6. The medium of claim 1 wherein said code for determining only analyzes points of said boundary information that are associated with respective edges that are less than a heuristic value.

7. The medium of claim 1 wherein said code for determining only analyzes vertex pairs associated with edges of an edge set that is a weighted acyclic graph.

8. The medium of claim 1 wherein said code for determining a plurality of vertices only analyzes vertices from a searchable set of vertices.

9. The medium of claim 1 wherein said searchable set of vertices only includes: (a) vertices associated with curvature greater than a first heuristic value and (b) vertices recursively grown by maximizing distances between adjacent vertices subject to the following constraints: (i) said maximizing distances are less than a second heuristic value and (ii) each contours between adjacent vertices detected by said code for detecting approximate respective edges of said boundary information within a distortion criterion.

10. The medium of claim 1 wherein the user input is different for individual ones of the contours.

11. The medium of claim 1 wherein the user input selects an area of the graphical image wherein searching for the contours is performed.

12. The medium of claim 11 wherein the graphical image has an associated area, and the selected area comprises an area less than an entirety of the area of the graphical image.

13. The medium of claim 11 wherein the user input selects, for individual ones of the contours, at least one of the respective vertices and a width of the area.

14. A method for processing boundary information of a graphical object, comprising:
   receiving a graphical image that comprises said graphical object, wherein said graphical object is defined by at least said boundary information;
   determining a plurality of vertices from said boundary information, wherein adjacent vertices of said plurality of vertices are associated with respective contours that approximate respective edges of said boundary information within a distortion criterion, wherein said respective contours are detected by analysis of said graphical image by a predetermined function and responsive to different user input for respective individual ones of the contours, wherein said predetermined function is operable to calculate gradients calculated from said graphical image utilizing a pixel neighborhood defined by a scale parameter;

encoding at least said plurality of vertices in a data structure to represent said boundary information; and converting graphical information of the data structure from a first format to a second format different than the first format.

15. The method of claim 14 wherein said predetermined function is operable to determine a shortest path between adjacent vertices, wherein said shortest path is weighted by the gradients calculated from said graphical image.

16. The method of claim 15 wherein said predetermined function is operable to determine said shortest path from only a spatial area defined by at least a width parameter.

17. The method of claim 14 wherein said determining comprises identifying a point of said boundary information that is associated with a greatest amount of curvature.

18. The method of claim 14 wherein said determining only analyzes vertex pairs associated with edges that are shorter than a heuristic value.

19. The method of claim 14 wherein said determining only selects vertices from a searchable set of vertices.

20. The method of claim 19 wherein said searchable set of vertices only includes: (a) vertices associated with curvature greater than a first heuristic value and (b) vertices recursively grown by maximizing distances between adjacent vertices subject to the following constraints: (i) said maximizing distances are less than a second heuristic value and (ii) respective contours between adjacent vertices approximate respective edges of said boundary information within a distortion criterion.

21. The method of claim 14 wherein the user input is different for individual ones of the contours.

22. The method of claim 14 wherein the predetermined function comprises a Rubberband function.

23. The method of claim 14 further comprising extracting the graphical information defined by the boundary information from the graphical image.

24. The method of claim 23 wherein the extracting comprises extracting a subset of the graphical information of the graphical image comprising less than an entirety of the graphical information of the graphical image.

25. A method for processing boundary information associated with an object in a graphical image, said method comprising:

identifying two vertices in said graphical image;

detecting a plurality of contours between said two vertices by determining a respective shortest path between said two vertices, said respective shortest path being weighted by gradient calculations that utilize a pixel neighborhood defined by a scale parameter of said graphical image over regions defined at least by the scale parameter, and each contour of said plurality of contours being associated with a respective scale parameter of a plurality of scale parameters; and selecting an optimal scale parameter from said plurality of scale parameters by determining a scale parameter from said plurality of scale parameters that minimizes variance between regions defined by its respective contours.

26. The method of claim 25 wherein said method further comprising:

encoding a boundary object utilizing said two vertices and said optimal scale parameter.

27. The method of claim 25 wherein said detecting further comprising:

incrementally detecting a contour of said plurality of contours by utilizing a threshold value, wherein said shortest path is determined by a graph searching process that limits searching of paths to distances less than said threshold value.

28. The method of claim 25 wherein said detecting a plurality of contours is operable to only select contours within a rectangular area defined by a width parameter and said two vertices.

29. The method of claim 28 wherein said width parameter and said two vertices are selected by a user interface.

30. The method of claim 25 wherein the detected contours approximate respective edges of the boundary information.

31. The method of claim 30 wherein the edges of the boundary information exist before the detecting.

32. A computer comprising:

a display configured to depict a graphical image comprising a graphical object;

a user interface configured to receive user input; and processing circuitry coupled with the display and configured to determine a plurality of vertices using boundary information of the graphical object, and to detect a plurality of contours between respective pairs of the vertices responsive to respective user input received via the user interface, wherein the contours approximate respective edges of the boundary information of the graphical object within a distortion criterion, and wherein said processing circuitry is configured to implement a predetermined function operable to calculate gradients associated with said graphical image, wherein said calculated gradients are calculated over respective spatial areas of said graphical image limited by a scale parameter.

33. The computer of claim 32 wherein the user input is different for individual ones of the contours.

* * * * *

UNITED STATES PATENT AND TRADEMARK OFFICE
CERTIFICATE OF CORRECTION

PATENT NO. : 7,388,988 B2
APPLICATION NO. : 10/046797
DATED : June 17, 2008
INVENTOR(S) : Huitao Luo It is certified that error appears in the above-identified patent and that said Letters Patent is hereby corrected as shown below:

On the title page, item (56), under "Other Publications", in column 2, lines 1-3, delete "Huitao Luo and Alexandros Eleftheriadis, "Designing an Interactive Tool for Video Object Segementation and Annotation," Advent Group, Columbia University, Jul. 12, 1999.". (Repeated entry)

In column 7, line 14, after "of" insert -- the original --.

In column 8, line 10, delete "si" and insert -- $s_i$ --, therefor.

In column 9, line 16, delete "$b_N^{(s)}$" and insert -- $b_{N_s}^{(s)}$ --, therefor.

In column 9, line 21, delete "n," and insert -- $n_s$ --, therefor.

In column 13, line 25, delete "argmax" and insert -- arg max --, therefor.

In column 13, line 41, delete "argmax" and insert -- arg max --, therefor.

In column 14, line 37, delete "<,>" and insert -- $\langle , \rangle$ --, therefor.

In column 14, line 67, delete "$P_{74}(x)$" and insert -- $P_\theta(x)$ --, therefor.

In column 15, line 1, delete "$P_{74}(x)$" and insert -- $P_\theta(x)$ --, therefor.

Signed and Sealed this

Thirteenth Day of January, 2009

JON W. DUDAS
*Director of the United States Patent and Trademark Office*